(12) United States Patent
Segerljung

(10) Patent No.: US 7,416,188 B2
(45) Date of Patent: Aug. 26, 2008

(54) VEHICLE AND A METHOD FOR CONTROL THEREOF

(75) Inventor: Max Segerljung, Vännäs (SE)

(73) Assignee: Stock of Sweden AB, Stromsund (SE)

( * ) Notice: Subject to any disclaimer, the term of this patent is extended or adjusted under 35 U.S.C. 154(b) by 371 days.

(21) Appl. No.: 10/521,213

(22) PCT Filed: Jun. 23, 2003

(86) PCT No.: PCT/SE03/01071

§ 371 (c)(1),
(2), (4) Date: Jan. 13, 2005

(87) PCT Pub. No.: WO2004/007223

PCT Pub. Date: Jan. 22, 2004

(65) Prior Publication Data

US 2005/0257965 A1 Nov. 24, 2005

(30) Foreign Application Priority Data

Jul. 15, 2002 (SE) .................................. 0202207

(51) Int. Cl.
*B60G 17/005* (2006.01)

(52) U.S. Cl. .............................. 280/5.502; 280/124.112; 280/755

(58) Field of Classification Search .............. 280/5.501, 280/5.502, 6.15, 6.151, 6.153, 6.154, 6.155, 280/79.11, 124.11, 124.111, 124.112, 755
See application file for complete search history.

(56) References Cited

U.S. PATENT DOCUMENTS

| | | | | |
|---|---|---|---|---|
| 1,273,412 A | * | 7/1918 | Salsbury | 180/358 |
| 2,047,286 A | * | 7/1936 | Opolo | 267/251 |
| 2,062,012 A | * | 11/1936 | Opolo | 267/233 |
| 2,173,068 A | * | 9/1939 | Schroeder | 280/400 |
| 2,792,234 A | * | 5/1957 | Page | 280/400 |
| 2,805,079 A | * | 9/1957 | Vostrez | 280/79.11 |
| 2,838,124 A | * | 6/1958 | Cramer, Jr. | 180/366 |
| 3,154,164 A | * | 10/1964 | Shaw et al. | 180/209 |

(Continued)

FOREIGN PATENT DOCUMENTS

WO   03/024858   3/2003

*Primary Examiner*—Christopher Bottorff
*Assistant Examiner*—Barry Gooden, Jr.
(74) *Attorney, Agent, or Firm*—Dilworth & Barrese, LLP

(57) ABSTRACT

A vehicle having a chassis (1) and at least two mutually separated wheels arranged on a first side of the chassis and two mutually separated wheels on the opposite, second side of the chassis where the wheels on the first side are rotatable about axes that are substantially fixed in position in a vertical plane relative to the chassis and the wheels (5) on the second side are arranged on a frame part (6) that is pivotably arranged relative to the chassis about a central longitudinal axis (8) running between the first and second sides of the vehicle to create a stability area for the vehicle in the shape of a triangle in the horizontal plane. Means (17) is designed so that when the vehicle's tipping point reaches the boundary area of the stability triangle the means starts to gradually increase the resistance against the tipping of the frame part relative to the chassis about said axis on increasing departure of the tipping point from the triangle's centre and when the tipping point reaches a predetermined boundary to completely fix the frame part relative to the chassis and form a stability area to be defined by said wheels.

20 Claims, 2 Drawing Sheets

U.S. PATENT DOCUMENTS

| | | | |
|---|---|---|---|
| 3,605,929 A * | 9/1971 | Rolland | 180/208 |
| 3,879,053 A * | 4/1975 | Chvala | 280/6.15 |
| 3,909,022 A * | 9/1975 | Claxton | 280/6.155 |
| 4,159,749 A * | 7/1979 | Boushek, Jr. | 180/308 |
| 4,512,589 A * | 4/1985 | Ambrose et al. | 280/5.502 |
| 4,647,067 A * | 3/1987 | Paquette et al. | 280/676 |
| 5,188,248 A | 2/1993 | Dohnalik | |
| 5,538,266 A * | 7/1996 | Martin et al. | 280/6.154 |
| 5,639,119 A * | 6/1997 | Plate et al. | 280/754 |
| 5,709,394 A * | 1/1998 | Martin et al. | 280/6.154 |
| 5,813,697 A * | 9/1998 | Bargenquast et al. | 280/754 |
| 5,871,218 A * | 2/1999 | Lepage et al. | 280/33.992 |
| 5,947,516 A * | 9/1999 | Ishikawa | 280/755 |
| 6,082,742 A * | 7/2000 | Ishikawa | 280/5.508 |
| 6,179,304 B1 * | 1/2001 | Ishikawa et al. | 280/5.508 |
| 6,336,784 B1 * | 1/2002 | Monaghan | 414/685 |
| 6,394,216 B1 * | 5/2002 | Gordon | 180/311 |
| 6,796,568 B2 * | 9/2004 | Martis et al. | 280/124.111 |
| 7,020,551 B2 * | 3/2006 | Goebels et al. | 701/38 |
| RE39,477 E * | 1/2007 | Nellers et al. | 280/754 |
| 2002/0093153 A1 * | 7/2002 | Scotese et al. | 280/6.153 |

* cited by examiner

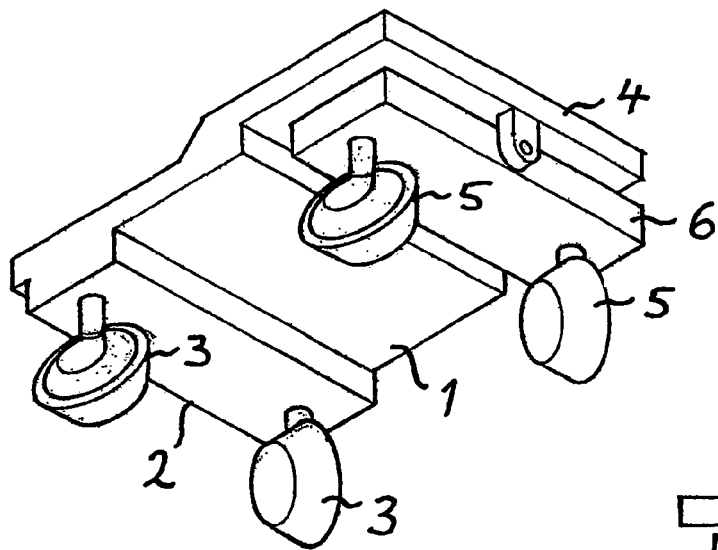
Fig 1
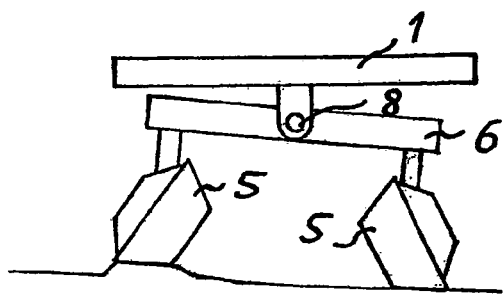
Fig 2
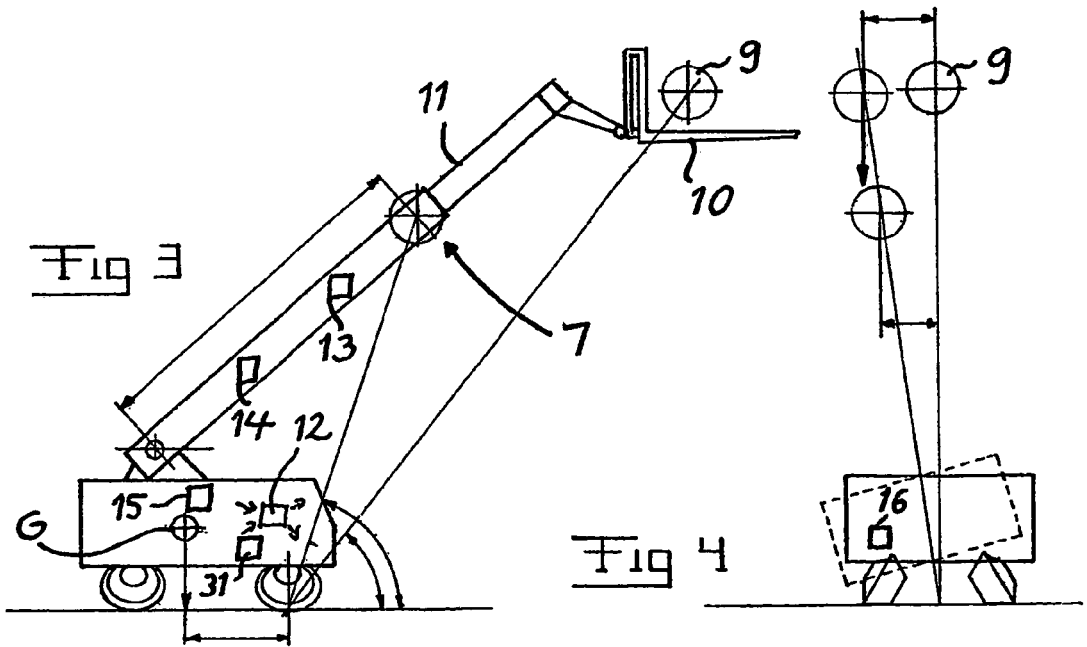
Fig 3
Fig 4

VEHICLE AND A METHOD FOR CONTROL THEREOF

BACKGROUND OF THE INVENTION AND PRIOR ART STATEMENT

The present invention concerns a vehicle and a method for controlling the stability against tipping of the vehicle according to the description herein.

The vehicle can be of any type that is intended for a use in which the risk of the vehicle tipping over exists and therefore an arrangement to determine the position of the vehicle's tipping point is necessary. It will be apparent that the invention is specially intended for vehicles equipped with lifting units to lift loads, which can substantially displace the vehicle's tipping point by having significant weight and/or displacement relative to the vehicle's own centre of gravity. The invention is therefore particularly related to industrial trucks, and such, for lifting and transporting loads, mainly at industrial sites, warehouses or loading yards. It is however even possible that the risk of the vehicle tipping over is dependent on the fact that it driven over uneven ground, which can displace the vehicle's tipping point outside the stability area.

In order to illustrate the invention, but not in any way to limit the invention, a vehicle in the form of an industrial truck will mainly be described hereafter.

The reason why a vehicle is provided with a frame part that is pivotable relative to the chassis in this way around a so-called swing axle is that the vehicle can thereby move over uneven ground in a significantly more comfortable way than if the frame part was locked relative to the chassis since, because of this, the vehicle will not lean as much to the side as would otherwise be the case.

However this means that the vehicle's stability area, i.e. the area, defined in the horizontal plane, within which the vehicle's centre of gravity has to be located so that the vehicle will not tip, more particularly a triangle defined by both of the wheels located on the first side and the swing axis' point on the other side, becomes smaller. In order to prevent the vehicle from overturning in situations which it would have managed in the case of fixing the frame part relative to the chassis it is known to arrange said means for locking the frame part relative to the chassis on the orders of the arrangement. However when this takes place one refrains from the advantages that pivoting possibilities around the swing axle entail. If the vehicle's tipping point is later displaced further towards the stability area's boundary an emergency stop will eventually be required, which prevents the vehicle from carrying out manoeuvres other than those that bring the tipping point nearer to the centre of the stability area.

SUMMARY OF THE INVENTION

The aim of the present invention is to provide a vehicle and a method according to the type defined in the introduction which improve the behaviour and way of driving such a vehicle in relation to such known vehicles and methods.

This aim is achieved according to the invention by designing the means for locking the frame part relative to the chassis of such a vehicle where said means is designed to co-operate with the arrangement so that when the vehicle's tipping point reaches a boundary area of the stability triangle the means starts to gradually increase the resistance against a pivoting of the frame part relative to the chassis about said axis on increasing departure of the tipping point from the triangle's centre so as to gradually increase the stability area and when said tipping point reaches a pre-determined boundary to completely fix the frame part relative to the chassis and form a stability area to be defined by said wheels.

This makes the same stability possible as that obtained with said known vehicles and at the same time the advantageous movement, that the movability of the frame part relative to the chassis offers when driving over uneven ground, can be maintained in an increased number of the vehicle's driving situations. This movability and the advantages with it will thereby become more and more limited the further the tipping point moves from the stability triangle's centre until it eventually totally disappears.

According to a preferred embodiment of the invention the arrangement is designed to receive parameters necessary for calculating the position of the vehicle's instantaneous centre of gravity from sensors included in the vehicle and/or means for controlling the vehicle's operation, to calculate the position of the vehicle's instantaneous centre of gravity, and the arrangement is arranged to determine the position of said centre of gravity by calculating the position of the vehicle's instantaneous centre of gravity. It is therefore advantageous if the arrangement is arranged to carry out calculations to determine the position of the boundary layer and the predetermined boundary while considering the vehicle's instantaneous velocity to reduce the area within the respective boundary as the vehicle increases its velocity, so that there is a margin to the stability area's outer boundary as regards the tipping point's placement so as to be able to carry out relatively abrupt swings of the vehicle at the velocity existing at a particular moment without the risk of tipping.

According to another preferred embodiment of the invention said means is arranged to engage a resistive force to counteract the relative movement between the frame part and the chassis intermittently during time periods, whose length per unit time is controlled to increase in order to achieve said gradual increase. This provides a simple way of achieving an increasing expansion of the stability area in the vicinity of said other side of the vehicle.

According to another preferred embodiment of the invention said means comprises longitudinally variable pressure medium influenced power means, arranged to act between the frame part and the chassis, having two pressure chambers connected to one another via an outer by-pass conduit with valve means, and disposed on both sides of a piston, and the valve means are adjustable so as to effect the pressure medium's capability to flow from the first chamber to the second chamber and thereby the resistance against a displacement of the piston and a length' change of the power means. The power means can thereby advantageously be a hydraulic cylinder. The inventive solution can hereby be realized by simple means by controlling the valve means' degree of throttling, and when the valve means is totally closed the frame part will be totally locked relative to the chassis and the stability area will be defined by the vehicle's wheels.

The invention even relates to a method according to the description herein. The advantages with this method and the advantageous embodiments thereof are apparent from the above description.

According to another aspect of the invention a vehicle of the type defined in the introduction comprises means to attach each said wheel on the second side of said frame part which is designed to give the wheel a fixed position relative to the frame part and thus to ensure that the frame part has a fixed distance to the ground on which the wheel is resting on application of a load to the wheel below a pre-determined level, which exceeds the normal load on the wheel when the vehicle is standing on horizontal ground, and to allow a movement of the wheel in the direction towards the frame part on exceeding said determined level of the load on the wheel while storing potential energy and decreasing the distance between the frame part and the ground on which the wheel is resting at the wheel. This makes it possible to further reduce the leaning of the vehicle laterally if it is driven over an obstruction with one of the wheels on the second side with high velocity, so that the risk of tipping the vehicle over due to the relatively high velocity of the vehicle is reduced. According to a preferred embodiment of the invention said means are designed to attach the wheels to the frame part so that the said pre-determined level of load is adapted so that it is exceeded on driving the vehicle with the wheels in question over an obstruction at a velocity above a pre-determined velocity.

Advantageously said means for fixing the wheels to the frame part comprises a resilient member for each wheel arranged between the frame part and a part that carries the wheel's axle, the resilient member is arranged to be pre-loaded against stop means arranged to prevent the resilient member from releasing potential energy by distancing the frame part from the part carrying the wheel axle, and the degree of pre-loading of the resilient member is adjusted to determine the said pre-determined level of load. The inventive function is hereby ensured by simple and reliable means by a resilient behaviour of the wheel device on sudden high loads but an arrangement of the wheel being otherwise inelastic and non-resilient.

The invention even relates to a computer program and a computer readable medium according to the corresponding attached claims. It is considered to be apparent that the method according to the invention defined in the attached set of claims is well suited to be carried out via program instructions from a processor that can be influenced by a computer program containing the program steps in question.

Further advantages of the invention and advantageous features thereof will be apparent from the following description.

BRIEF DESCRIPTION OF THE DRAWINGS

Preferred embodiments will be described below as examples with reference to the attached drawings, in which:

FIG. 1 schematically illustrates the general structure of a vehicle of the inventive type, FIG. 2 schematically illustrates how a vehicle built according to FIG. 1 behaves on movement over uneven ground, FIG. 3 is a simplified side view illustrating how the tipping point of a vehicle of the inventive type can be moved on displacing a load, FIG. 4 is a rear view of the vehicle according to FIG. 3 illustrating how the centre of gravity is laterally displaced when the vehicle leans sidewards.

DETAILED DESCRIPTION OF PREFERRED EMBODIMENTS OF THE INVENTION

Figure 5:
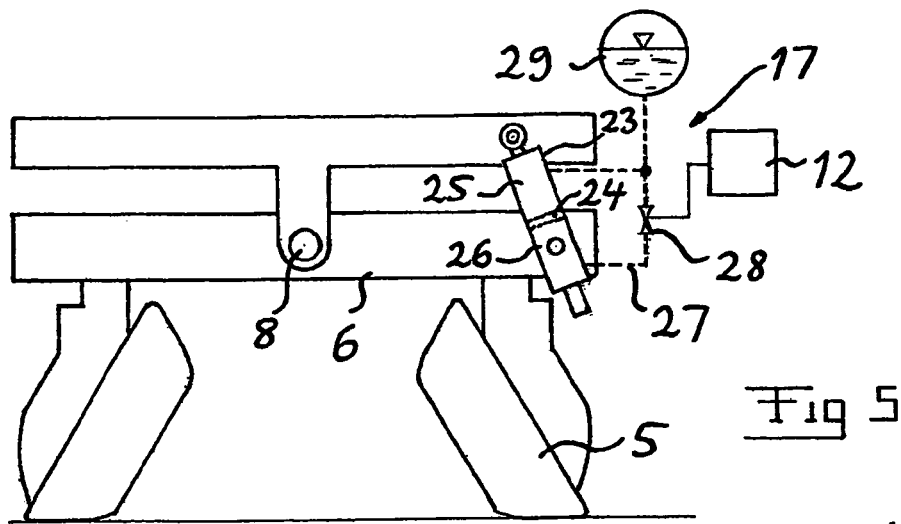
FIG. 5 is a simplified view illustrating the structure of the vehicle according to a preferred embodiment of the invention.

FIG. 1 illustrates very schematically the structure of the under carriage of the vehicle of the inventive type. It shows a schematically indicated chassis 1 and two mutually separated wheels 3 arranged on a first side 2 of the chassis and two mutually separated wheels 5 on the opposite, second side of the chassis 4 for carrying the chassis. The wheels 3 on the first side are rotatable around axes which are substantially fixed in position in a vertical plane relative to the chassis, and the wheels 5 on the second side are arranged on a frame part 6 that is pivotably arranged relative to the chassis about a substantially central longitudinal axis running between the first and second side of the vehicle to create a stability area for the vehicle in the shape of a triangle in the horizontal plane (see FIG. 6). The frame part is thereby arranged on the opposite side of the vehicle with respect to the lifting unit 7 for lifting the load which is also shown in FIG. 3, which is therefore arranged on the side where the wheel's axes are substantially fixed in position in the vertical plane.

When a wheel of a vehicle of this type is driven over an obstruction the frame part 6 will be able to pivot about the axis 8 relative to the chassis in the way shown in FIG. 2, so that the chassis does not lean as much as it would if the frame part were fixedly attached to the chassis.

FIG. 3 schematically illustrates how the vehicle's lifting unit lifts a load 9 with forks 10 on a projecting beam 11. The beam's arm as well as the load's height and weight will effect the vehicle's tendency to tip forwards. The vehicle comprises a schematically indicated arrangement 12 to determine the position of the vehicle's tipping point. For this reason the vehicle has schematically indicated means 13 to measure the weight of the load, for example by measuring the pressure in a hydraulic system which is used to lift the load, and sending that information to the arrangement 12. Other means 14 provide the arrangement with information about the size of the load's overhang and the height of the load. The vehicle even has a schematically indicated sensor to detect the vehicle's leaning relative to the horizontal plane and to provide that information to the arrangement 12. The arrangement even has knowledge of the vehicle's dead weight and centre of gravity G position in the unloaded position with the beam not extended. On the basis of the information available to the arrangement 12, the arrangement 12 can continuously determine the position of the vehicle's tipping point and whether any risk of the vehicle tipping over exists.

FIG. 4 schematically illustrates how the vehicle's tipping point can be laterally displaced in the cases where the vehicle with the load 9 leans sideways, for example by driving over an obstruction. The vehicle even has sensors 16 for reporting such a sideways leaning to the arrangement 12.

Figure 6:
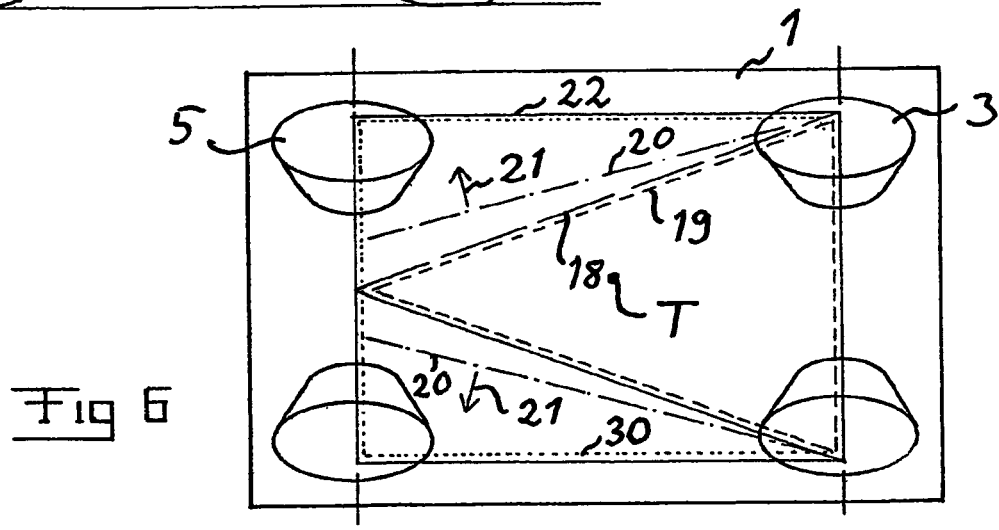
FIG. 6 is a simplified view from above of a vehicle according to the invention illustrating its stability area.

The vehicle according to the invention also has means 17 shown in FIG. 5 to lock the frame part relative to the chassis on the orders of the arrangement to increase the vehicle's stability area to be defined by the wheels in the way that will be described with simultaneous reference to FIG. 6. When the frame part is freely pivotable relative to the chassis about the axis 8 the vehicle's stability area is defined by a triangle 18 shown in FIG. 6. The arrangement is arranged to continuously determine the position of the vehicle's centre of gravity T in the horizontal plane and when this reaches a boundary area indicated by the dashed line 19 on increasing departure of the centre of gravity or the tipping point from the triangle's centre the resistance against pivoting of the frame part relative to the chassis about the axis 8 is gradually increased, so that the stability area is gradually increased as illustrated by the dashed lines 20 and the arrows 21, until complete fixing of the frame part relative to the chassis takes place and a stability rectangle 22 is obtained. For this reason said fixing means comprises a hydraulic cylinder 23 between the frame part 6 and the chassis 1 with two pressure chambers 25, 26, that are interconnected via a by-pass conduit 27 with a valve means 28. An accumulated tank 29 is attached to the by-pass conduit to ensure that a certain pressure exists in the by-pass conduit. The control means 12 is arranged to control the valve 28 and thereby the resistance against movement of the piston 24 inside the hydraulic cylinder 23 and thereby the frame part relative to the chassis. When the valve means 28 is completely open the piston 24 can move freely in the cylinder 23 by displacing hydraulic liquid from one pressure chamber to the other via the by-pass conduit. If the valve means 28 is instead closed, the hydraulic cylinder 23 will function as a rigid bar and totally fix the frame part relative to the chassis. Said means 17 is arranged to achieve the gradual increase of the vehicle's stability area by intermittently, in a regulating, possibly pulsating way open and close the valve means with an increasing ratio of closed time to open time.

The arrangement 12 is further arranged so that in the cases where the tipping point reaches a position distant to the stability area's outer boundary, i.e. when it leaves a so-called safety zone indicated here by region 30, the drive means of the vehicle will be fixed so as only to be able to carry out movements of the vehicle having a stabilising effect to move the vehicle's tipping point away from the stability area's outer edge. This means that the vehicle for example can no longer be driven and the lifted load has to be lowered and carried nearer to the vehicle before the vehicle becomes operational again.

The vehicle has a sensor 31 to detect the vehicle's velocity arranged to send velocity information to the arrangement 12, so that the position of said boundary area edge 19 and the safety zone boundary 30 can be determined considering this velocity in order to decrease the area inside the respective boundary on increasing vehicle velocity.

Figure 7:
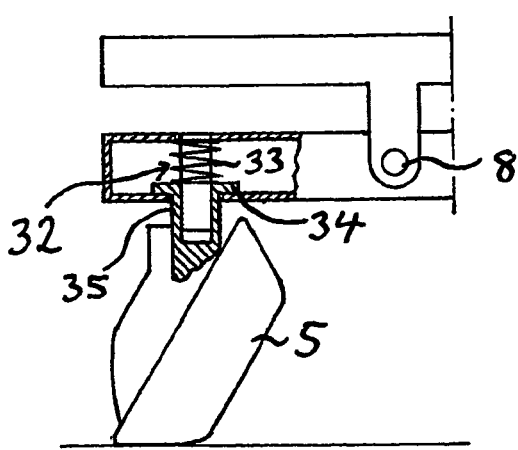
FIG. 7 is a view illustrating the device at a wheel of a vehicle according to a preferred embodiment of the invention.

FIG. 7 illustrates how, according to a preferred embodiment of the invention, each wheel 5 of said second side at said frame part comprises a means 32 arranged to give the wheel a fixed position relative to the frame part and thereby to give the frame part a fixed distance to the ground on which the wheel is resting on application of a load to the wheel below a predetermined level, which exceeds the normal load on the wheel when the vehicle is standing on horizontal ground, and to allow a movement of the wheel in the direction towards the frame part on exceeding said determined level of the load on the wheel while storing potential energy and decreasing the distance between the frame part and the ground on which the wheel is resting at the wheel. More particularly means 32 comprises a resilient member 33 in the form of a mechanical compression spring, that is arranged to be preloaded against stop means 34 arranged to prevent the resilient member from releasing potential energy by distancing the frame part from the part 35 carrying the wheel axle. The degree of preloading of the resilient member is thereby adjusted to determine said predetermined level of load, and advantageously this is done so that this level is exceeded on driving the vehicle with the wheels in question over an obstruction with a velocity over a predetermined velocity.

Figure 8:
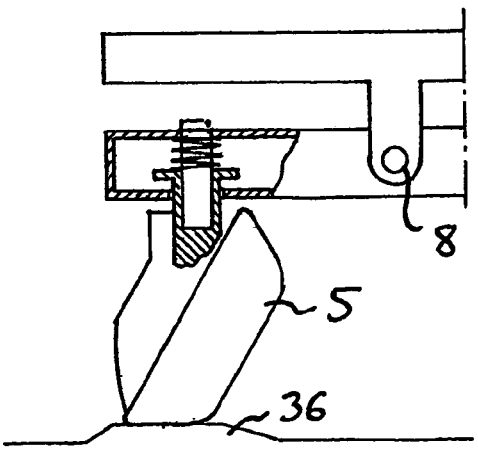
FIG. 8 illustrates in a very simplified way what happens when a vehicle with a wheel device according to FIG. 7 drives over an obstruction with a velocity exceeding a predetermined level.

FIG. 8 shows very schematically the effect that the spring 13 has on the vehicle's behaviour on driving over an obstruction 36 with a wheel 5. This therefore means that the vehicle's leaning will be reduced just when it is most critical, i.e. when the velocity is high.

The invention is of course not in any way limited to the preferred embodiments described above, but a number of modification possibilities should be apparent to a person skilled in the art, without him having to deviate from the basic idea of the invention.

For example it would theoretically be possible to arrange means that more continuously increases the resistance against pivoting of the frame part relative to the chassis on said increase of distance of the vehicle's tipping point from the stability area's centre, pneumatically or electrically for example. It would even be possible to give the valve means shown a step-lessly variable degree of throttling.

The compression spring shown in FIG. 7 could be replaced by a gas spring.

As regards the use of the words "horizontal" and "vertical" in this document in relation to the vehicle, these directions apply when the vehicle is resting on horizontal ground, and axes, and such, are of course differently directed on driving on sloping ground or over obstructions.

"Substantially central longitudinal axis of the vehicle" should be interpreted relatively broadly. This longitudinal axis can at any time be displaced in a transverse direction relative to the vehicle's centre to compensate for a lateral displacement of the vehicle's centre of gravity relative to its centre. Such a displacement can for example depend on the fact that a lifting unit, a beam or such is positioned on one side of the vehicle, and even the pivoting axis is then arranged somewhat displaced towards that side relative to the centre.

The invention claimed is:

1. Vehicle comprising
   a chassis (1),
   at least two mutually separated wheels (3) arranged on a first side (2) of the chassis and two mutually separated wheels (5) on the opposite, second side of the chassis (4),
   the wheels being arranged to support the chassis when resting on the ground, with the wheels on the first side rotatable about axes substantially fixed in position in the vertical direction relative to the chassis and the wheels on the second side arranged on a frame part (6) pivotably arranged relative to the chassis about a substantially central longitudinal axis (8) running between the first and the second sides of the vehicle to create a stability area for the vehicle in the shape of a triangle in the horizontal plane,
   an arrangement (12) to determine the position of the vehicle's tipping point (T) in relation to the stability area and thereby the vehicle's stability, and
   means (17) for fixing the frame part relative to the chassis on the order of the arrangement to increase the vehicle's stability area to be defined by said wheels, wherein
   said arrangement (12) is structured and arranged to continuously determine the position of the vehicle's tipping point (T),
   when the vehicle's tipping point reaches a boundary area (19) of the stability triangle, the fixing means (17) are structured and arranged to gradually increase the resistance against a pivoting of the frame part relative to the chassis about said longitudinal axis on increasing distance of the tipping point from the triangle's centre to gradually increase the stability area, and
   when said tipping point reaches a pro-determined boundary, said fixing means (17) are structured and arranged to completely fix the frame part (6) relative to the chassis (1) and form a stability area defined by said wheels, and
   said wheels (5) mounted on the second side are mounted underneath said pivotally-arranged frame part (6).

2. Vehicle according to claim 1, wherein
   the arrangement (12) is designed to receive parameters necessary for calculating the position of the vehicle's instantaneous centre of gravity from sensors (13-16) included in the vehicle and/or means for controlling the vehicle's operation, to calculate the position of the vehicles instantaneous centre of gravity, and the arrangement is arranged to determine the position of said centre of gravity by calculating the position of the vehicle's instantaneous centre of gravity.

3. Vehicle according to claim 1, wherein
the arrangement is arranged to carry out calculations to determine the position of said boundary area (19) and pre-determined boundary while considering the vehicle's instantaneous velocity to reduce the area within the respective boundary as the vehicle increases its velocity.

4. Vehicle according to claim 1, wherein said means (17) for gradually increasing the resistance against pivoting of the frame part (6) relative to the chassis (1) on departure of the tipping point from the triangle's centre is arranged to engage a resistive force to act against the relative movement between the frame part and the chassis intermittently during time periods, whose length per unit time is controlled to increase in order to achieve said gradual increase.

5. Vehicle according to claim 4, wherein said means (17) is arranged to open and close the valve means (28) intermittently, in a controlled way when the vehicle's tipping point reaches said boundary area.

6. Vehicle according to claim 1, wherein
said means (17) for gradually increasing the resistance against pivoting of the frame part (6) relative to the chassis (1) on departure of the tipping point from the triangle's centre comprises longitudinally variable, pressure-medium-influenced power means (23) arranged to act between the frame part and the chassis with two pressure chambers (25, 26) connected to one another via an outer bypass conduit (27) with valve means (28), and disposed on both sides of a piston (24), and
the valve means are adjustable to affect the pressure medium's capability to flow from the first chamber to the second chamber and thereby the resistance against a displacement of the piston and a length change of the power means.

7. Vehicle according to claim 6, wherein the power means (23) is a hydraulic cylinder.

8. Vehicle according to claim 1, wherein it comprises a lifting unit (7) to lift heavy loads, and this lifting unit is arranged on said first side (2) of the chassis.

9. Vehicle comprising
a chassis (1),
at least two mutually separated wheels (3) arranged on a first side (2) of the chassis and two mutually separated wheels (5) on the opposite, second side of the chassis (4),
the wheels being arranged to support the chassis when resting on the ground, with the wheels on the first side rotatable about axes substantially fixed in position in the vertical direction relative to the chassis and the wheels at the second side are arranged on a frame part (6) pivotably arranged relative to the chassis about a substantially central longitudinal axis (8) running between the first and the second sides of the vehicle to create a stability area for the vehicle in the shape of a triangle in the horizontal plane,
an arrangement (12) to determine the position of the vehicle's tipping point (T) in relation to the stability area and thereby the vehicle's stability,
means (17) for fixing the frame part relative to the chassis on the order of the arrangement to increase the vehicle's stability area to be defined by said wheels, and
means (32) for attaching each said wheel (5) on said frame part (6) to:

(i) fix the wheel in position relative to the frame part (6) and ensure the frame part has fixed distance to the ground on which the wheel is resting, on application of a load to the wheel below a pre-determined level, and (ii) allow a movement of the wheel towards the frame part when the load on the wheel exceeds the pre-determined level, storing potential energy and decreasing the distance between the frame part and the ground on which the wheel is resting, and said wheels (5) mounted on the second side are mounted underneath said pivotally-arranged frame part (6).

10. Vehicle comprising
a chassis (1),
at least two mutually separated wheels (3) arranged on a first side (2) of the chassis and two mutually separated wheels (5) on the opposite, second side of the chassis (4),
the wheels being arranged to support the chassis when resting on the ground, with the wheels on the first side rotatable about axes substantially fixed in position in the vertical direction relative to the chassis and the wheels on the second side arranged on a frame part (6) pivotably arranged relative to the chassis about a substantially central longitudinal axis (8) running between the first and the second sides of the vehicle to create a stability area for the vehicle in the shape of a triangle in the horizontal plane,
an arrangement (12) to determine the position of the vehicle's tipping point (T) in relation to the stability area and thereby the vehicle's stability, and
means (17) for fixing the frame part relative to the chassis on the order of the arrangement to increase the vehicle's stability area to be defined by said wheels, wherein
said means (17) are designed to co-operate with the arrangement (12) so that when the vehicle's tipping point reaches a boundary area (19) of the stability triangle the fixing means (17) starts to gradually increase the resistance against a pivoting of the frame part relative to the chassis about said longitudinal axis on increasing distance of the tipping point from the triangle's centre to gradually increase the stability area, and
when said tipping point reaches a pre-determined boundary, to completely fix the frame part (6) relative to the chassis (1) and form a stability area defined by said wheels, and
further comprising means arranged to communicate with said arrangement (12) and on obtaining information that said tipping point is located at a distance below a predetermined value from the stability area's outer boundary, lock the drive means of the vehicle to only be able to carry out movements of the vehicle having a stabilizing effect in order to move the vehicle's tipping point away from the stability area's outer edge.

11. Vehicle comprising
a chassis (1),
at least two mutually separated wheels (3) arranged on a first side (2) of the chassis and two mutually separated wheel (5) on the opposite, second side of the chassis (4),
the wheels being arranged to support the chassis when resting on the ground, with the wheels on the first side rotatable about axes substantially fixed in position in the vertical direction relative to the chassis and the wheels at the second side are arranged on a frame part (6) pivotably arranged relative to the chassis about a substantially central longitudinal axis (8) running between the first and the second sides of the vehicle to create a stability area for the vehicle in the shape of a triangle in the horizontal plane, an arrangement (12) to determine the position of the vehicle's tipping point (T) in relation to the stability area and thereby the vehicle's stability, means (17) for fixing the frame part relative to the chassis on the order of the arrangement to increase the vehicle's stability area to be defined by said wheels, and means (32) for attaching each said wheel (5) on said frame part (6) to:

(i) fix the wheel in position relative to the frame part (6) and ensure the frame part has fixed distance to the ground on which the wheel is resting on application of a load to the wheel below a pre-determined level, and (ii) allow a movement of the wheel towards the frame part when the load on the wheel exceeds the pre-determined level, while storing potential energy and decreasing the distance between the frame part and the ground on which the wheel is resting, wherein said means (32) for fixing the wheels (5) to the frame part (6) are designed to attach the wheels (5) to the frame part (6) so that said pre-determined level of the load is adapted so that it is exceeded on driving the vehicle with the wheels in question over an obstruction at a velocity above a pre-determined velocity level.

12. Vehicle comprising a chassis (1), at least two mutually separated wheels (3) arranged on a first side (2) of the chassis and two mutually separated wheels (5) on the opposite, second side of the chassis (4), the wheels being arranged to support the chassis when resting on the ground, with the wheels on the first side rotatable about axes substantially fixed in position in the vertical direction relative to the chassis and the wheels at the second side are arranged on a frame part (6) pivotably arranged relative to the chassis about a substantially central longitudinal axis (8) running between the first and the second sides of the vehicle to create a stability area for the vehicle in the shape of a triangle in the horizontal plane, an arrangement (12) to determine the position of the vehicle's tipping point (T) in relation to the stability area and thereby the vehicle's stability, means (17) for fixing the frame part relative to the chassis on the order of the arrangement to increase the vehicle's stability area to be defined by said wheels, and means (32) for attaching each said wheel (5) on said frame part (6) to:

(i) fix the wheel in position relative to the frame part (6) and ensure the frame part has fixed distance to the ground on which the wheel is resting on application of a load to the wheel below a pre-determined level, and (ii) allow a movement of the wheel towards the frame part when the load on the wheel exceeds the pre-determined level, while storing potential energy and decreasing the distance between the frame part and the ground on which the wheel is resting, wherein said means (32) for fixing the wheels (5) to the frame part (6) comprises a resilient member (33) for each wheel arranged between the frame part and a part (35) that carries the wheel's axle, the resilient member is arranged to be preloaded against stop means (34) arranged to prevent the resilient member from releasing potential energy by distancing the frame part from the part carrying the wheel axle, and the degree of pre-loading of the resilient member is adjusted to determine the pre-determined level of load.

13. Vehicle according to claim 12, wherein the resilient member is a mechanical compression spring (33).

14. Method for controlling the stability of a vehicle against tipping and which comprises a chassis (1), at least two mutually separated wheels (3) arranged on a first side (2) of the chassis and two mutually separated wheels (5) on the opposite, second side of the chassis (4), the wheels being arranged to support the chassis when resting on the ground, with the wheels on the first side rotatable about axes substantially fixed in position in the vertical direction relative to the chassis and the wheels on the second side arranged on a frame part (6) pivotably arranged relative to the chassis about a substantially central longitudinal axis (8) running between the first and the second sides of the vehicle to create a stability area for the vehicle in the shape of a triangle in the horizontal plane, in which the position the vehicle's tipping point (T) in relation to the stability area and thus the vehicle's stability is determined and the frame part is fixed relative to the chassis when the result of this determination calls for an increase of the vehicle's stability area to be defined by said wheels, wherein when the determination results in that the vehicle's tipping point reaches a boundary area (19) of the stability triangle, a resistive force is gradually increased that opposes a pivoting of the frame part relative to the chassis about said axis on increasing distance of the tipping point from the centre of the triangle to gradually increase the stability area, and when the tipping point reaches a pre-determined boundary, the frame part is completely fixed relative to the chassis and creates a stability area defined by said wheels, and said wheels (5) mounted on the second side are mounted underneath said pivotally-arranged frame part (6).

15. Method according to claim 14, wherein said increase of the resistive force takes place by engaging a resistive force to act against the relative movement between the frame part (6) and the chassis (1) intermittently during time periods, whose length per unit time is controlled to increase in order to achieve said gradual increase.

16. Method according to claim 15, wherein said gradual increase of the resistive force against a pivoting of the frame part (6) relative to the chassis (1) takes place by intermittently, in a pulsing way, opening and closing valve means (28) arranged in an outer bypass conduit (27) that interconnects two pressure chambers (25, 26) that are disposed on opposite sides of a piston (24), to, in this way, affected the capability of the pressure medium disposed in the pressure chambers to flow from one chamber to the other chamber and thereby the resistance against a displacement of the piston.

17. A computer comprising internal memory and a computer program that is directly loaded into the internal memory of the computer and comprises software code parts to execute the steps of claim 14 when the program is run on the computer.

18. Computer readable memory with a registered program thereon, which is designed to cause a computer to execute the steps according to claim 14.

19. An apparatus for preventing tipping of a vehicle, comprising:

a computer;

a computer program provided at least partly via a network, directly loaded into internal memory of the computer and comprising software code parts when the program is run on the computer to execute the steps of a method for controlling the stability of the vehicle against tipping;

the vehicle comprising a chassis (1);

at least two mutually separated wheels (3) arranged on a first side (2) of the chassis and two mutually separated wheels (5) on the opposite, second side (4) of the chassis, with the wheels arranged to support the chassis when resting on the ground;

the wheels on the first side rotatable about axes substantially fixed in position in the vertical direction relative to the chassis and the wheels on the second side arranged on a frame part (6) pivotably arranged relative to the chassis about a substantially central longitudinal axis (8) running between the first and second sides of the vehicle to create a stability area for the vehicle in the shape of a triangle in the horizontal plane;

the program adapted to determine the position of the vehicle's tipping point (T) in relation to the stability area and thus the vehicle's stability and fix the frame part relative to the chassis by signaling a fixing means when the result of the determination calls for an increase of the vehicle's stability area to be defined by said wheels;

wherein when the determination results in that the vehicle's tipping point reaches a boundary area (19) of the stability triangle, a resistive force is gradually increased that opposes a pivoting of the frame part relative to the chassis about said axis on increasing distance of the tipping point from the centre of the triangle to gradually increase the stability area; and, when the tipping point reaches a predetermined boundary, the frame part is completely fixed relative to the chassis and creates a stability area defined by said wheels.

20. Vehicle comprising a chassis (1), at least two mutually separated wheels (3) arranged on a first side (2) of the chassis and two mutually separated wheels (5) on the opposite, second side of the chassis (4), the wheels being arranged to support the chassis when resting on the ground, with the wheels on the first side rotatable about axes substantially fixed in position in the vertical direction relative to the chassis and the wheels at the second side arranged on a frame part (6) pivotably arranged relative to the chassis about a substantially central longitudinal axis (8) running between the first and the second sides of the vehicle to create a stability area for the vehicle in the shape of a triangle in the horizontal plane, an arrangement (12) to determine the position of the vehicle's tipping point (T) in relation to the stability area and thereby the vehicle's stability, means (17) for fixing the frame part relative to the chassis on the order of the arrangement to increase the vehicle's stability area to be defined by said wheels, and means (32) for attaching each said wheel (5) on said frame part (6) to:

(i) fix the wheel in position relative to the frame part (6) and ensure the frame part has fixed distance to the ground on which the wheel is resting on application of a load to the wheel below a pre-determined level, and (ii) allow a movement of the wheel towards the frame part when the load on the wheel exceeds the pre-determined level, while storing potential energy and decreasing the distance between the frame part and the ground on which the wheel is resting, and means arranged to communicate with said arrangement (12) and on obtaining information that said tipping point is located at a distance below a predetermined value from the stability area's outer boundary, lock the drive means of the vehicle to only be able to carry out movements of the vehicle having a stabilizing effect in order to move the vehicles tipping point away from the stability area's outer edge.

* * * * *